(12) United States Patent
Contaldo et al.

(10) Patent No.: US 9,450,649 B2
(45) Date of Patent: Sep. 20, 2016

(54) SHAPING NEAR-FIELD TRANSMISSION SIGNALS

(71) Applicant: Marvell World Trade Ltd., St. Michael (BB)

(72) Inventors: Matteo Contaldo, Renens (CH); Frederic Declercq, Cossonay (CH)

(73) Assignee: Marvell World Trade Ltd., St. Michael (BB)

( * ) Notice: Subject to any disclaimer, the term of this patent is extended or adjusted under 35 U.S.C. 154(b) by 324 days.

(21) Appl. No.: 13/932,797

(22) Filed: Jul. 1, 2013

(65) Prior Publication Data

US 2014/0004794 A1 Jan. 2, 2014

Related U.S. Application Data

(60) Provisional application No. 61/667,107, filed on Jul. 2, 2012.

(51) Int. Cl.
*H04B 5/00* (2006.01)

(52) U.S. Cl.
CPC .......... *H04B 5/0075* (2013.01); *H04B 5/0031* (2013.01)

(58) Field of Classification Search
CPC .. H04B 5/0031; H04B 5/0075; H04B 3/237; H04W 72/1215
USPC ................................ 455/41.1, 41.3
See application file for complete search history.

(56) References Cited

U.S. PATENT DOCUMENTS

| 4,337,463 A | 6/1982 | Vangen |
| 4,366,350 A | 12/1982 | Lee et al. |
| 4,385,384 A | 5/1983 | Rosbury et al. |
| 4,805,215 A | 2/1989 | Miller |
| 5,347,234 A | 9/1994 | Gersbach et al. |
| 5,634,207 A | 5/1997 | Yamaji et al. |
| 5,673,291 A | 9/1997 | Dent |
| 5,708,656 A | 1/1998 | Noneman et al. |
| 5,847,616 A | 12/1998 | Ng et al. |
| 5,995,819 A | 11/1999 | Yamaji et al. |
| 6,035,210 A | 3/2000 | Endo et al. |
| 6,167,245 A | 12/2000 | Welland et al. |
| 6,285,262 B1 | 9/2001 | Kuriyama |
| 6,320,919 B1 | 11/2001 | Khayrallah et al. |

(Continued)

FOREIGN PATENT DOCUMENTS

| CN | 101320419 | 12/2008 |
| CN | 101425148 | 5/2009 |

(Continued)

OTHER PUBLICATIONS

"Non-Final Office Action", U.S. Appl. No. 13/911,979, Jan. 31, 2014, 19 pages.

(Continued)

*Primary Examiner* — Eugene Yun

(57) ABSTRACT

The present disclosure describes apparatuses and techniques for shaping near-field transmission signals. In some aspects, a baseband data signal is shaped based on a coupling condition of an antenna. A radio frequency (RF) carrier signal is modulated with the shaped baseband data signal to provide a shaped transmission signal, which is then applied to the antenna to generate an RF field. The shaped transmission signal can be effective to reduce distortions of the RF field associated with the coupling condition.

20 Claims, 9 Drawing Sheets

(56) References Cited

U.S. PATENT DOCUMENTS

| | | |
|---|---|---|
| 6,347,091 B1 | 2/2002 | Wallentin et al. |
| 6,366,622 B1 | 4/2002 | Brown et al. |
| 6,374,117 B1 | 4/2002 | Denkert et al. |
| 6,438,364 B1 | 8/2002 | Waite |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,738,358 B2 | 5/2004 | Bist et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,816,452 B1 | 11/2004 | Maehata |
| 6,816,718 B2 | 11/2004 | Yan et al. |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,092,428 B2 | 8/2006 | Chen et al. |
| 7,139,540 B2 | 11/2006 | Wu et al. |
| 7,139,547 B2 | 11/2006 | Wakayama et al. |
| 7,173,431 B1 | 2/2007 | Lo et al. |
| 7,174,488 B1 | 2/2007 | Chu |
| 7,206,840 B2 | 4/2007 | Choi et al. |
| 7,212,798 B1 | 5/2007 | Adams et al. |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,433,658 B1 | 10/2008 | Shirvani-Mahdavi et al. |
| 7,463,592 B2 | 12/2008 | Poncini et al. |
| 7,529,548 B2 | 5/2009 | Sebastian |
| 7,564,826 B2 | 7/2009 | Sherman et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,627,025 B2 | 12/2009 | Wang et al. |
| 7,627,026 B2 | 12/2009 | Wang et al. |
| 7,636,388 B2 | 12/2009 | Wang et al. |
| 7,656,205 B2 | 2/2010 | Chen et al. |
| 7,659,003 B2 | 2/2010 | Aoki et al. |
| 7,664,085 B2 | 2/2010 | Waxman |
| 7,672,645 B2 | 3/2010 | Kilpatrick et al. |
| 7,689,190 B2 | 3/2010 | Kerth et al. |
| 7,711,004 B2 | 5/2010 | Xu |
| 7,717,342 B2 | 5/2010 | Wang |
| 7,725,118 B2 | 5/2010 | Yang et al. |
| 7,734,253 B2 | 6/2010 | Chen et al. |
| 7,777,624 B2 | 8/2010 | Wu et al. |
| 7,826,411 B2 | 11/2010 | Gonikberg et al. |
| 7,844,222 B2 | 11/2010 | Grushkevich |
| 7,849,333 B2 | 12/2010 | Schindler |
| 7,876,786 B2 | 1/2011 | Bahl et al. |
| 7,881,746 B2 | 2/2011 | Desai |
| 7,893,216 B2 | 2/2011 | \*\*\*Liu et al. |
| 7,898,948 B2 | 3/2011 | DiGirolamo et al. |
| 7,936,714 B1 | 5/2011 | Karr et al. |
| 7,957,340 B2 | 6/2011 | Choi et al. |
| 7,966,036 B2 | 6/2011 | Kojima |
| 7,995,544 B2 | 8/2011 | Benveniste |
| 8,000,715 B2 | 8/2011 | Melpignano et al. |
| 8,014,329 B2 | 9/2011 | Gong |
| 8,045,922 B2 | 10/2011 | Sherman et al. |
| 8,046,024 B2 | 10/2011 | Sudak et al. |
| 8,060,017 B2 | 11/2011 | Schlicht et al. |
| 8,072,913 B2 | 12/2011 | Desai |
| 8,073,388 B2 | 12/2011 | Grushkevich et al. |
| 8,077,652 B2 | 12/2011 | Thesling |
| 8,078,111 B2 | 12/2011 | Jovicic et al. |
| 8,081,038 B2 | 12/2011 | Lee et al. |
| 8,085,737 B2 | 12/2011 | Zhu |
| 8,089,922 B2 | 1/2012 | Gonikberg et al. |
| 8,103,224 B1 | 1/2012 | Faravash et al. |
| 8,107,391 B2 | 1/2012 | Wu et al. |
| 8,121,144 B2 | 2/2012 | Bitran |
| 8,126,502 B2 | 2/2012 | Trainin |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,159,928 B2 | 4/2012 | Gorokhov et al. |
| 8,165,102 B1 | 4/2012 | Vleugels et al. |
| 8,170,002 B2 | 5/2012 | Wentink |
| 8,170,546 B2 | 5/2012 | Bennett |
| 8,189,506 B2 | 5/2012 | Kneckt et al. |
| 8,189,526 B2 | 5/2012 | Hsu et al. |
| 8,204,015 B2 | 6/2012 | Chaudhri et al. |
| 8,219,142 B2 | 7/2012 | Khairmode et al. |
| 8,229,087 B2 | 7/2012 | Sumioka et al. |
| 8,238,292 B2 | 8/2012 | Gonikberg et al. |
| 8,254,296 B1 | 8/2012 | Lambert |
| 8,256,681 B2 | 9/2012 | Wang |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,442,434 B2 | 5/2013 | Grushkevich et al. |
| 8,447,350 B2 | 5/2013 | Khairmode et al. |
| 8,451,776 B2 | 5/2013 | Dayal et al. |
| 8,472,427 B1 | 6/2013 | Wheeler et al. |
| 8,472,968 B1 | 6/2013 | Kim |
| 8,483,139 B2 | 7/2013 | Gonikberg et al. |
| 8,483,190 B2 | 7/2013 | Donovan |
| 8,493,966 B2 | 7/2013 | Bendelac |
| 8,493,992 B2 | 7/2013 | Sella et al. |
| 8,496,181 B2 | 7/2013 | Wang |
| 8,526,348 B2 | 9/2013 | Desai |
| 8,532,041 B1 | 9/2013 | Lambert et al. |
| 8,537,798 B2 | 9/2013 | Tsfati et al. |
| 8,537,799 B2 | 9/2013 | Tsfati et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,599,814 B1 | 12/2013 | Vleugels et al. |
| 8,600,324 B1 | 12/2013 | Cousinard et al. |
| 8,619,732 B2 | 12/2013 | Khairmode et al. |
| 8,626,067 B2 | 1/2014 | Ko et al. |
| 8,649,734 B1 | 2/2014 | Lin et al. |
| 8,654,773 B2 | 2/2014 | Wentink et al. |
| 8,655,278 B2 | 2/2014 | Laroche et al. |
| 8,655,279 B2 | 2/2014 | Banerjea |
| 8,665,848 B2 | 3/2014 | Wentink |
| 8,711,821 B2 | 4/2014 | Grandhi |
| 8,730,927 B2 | 5/2014 | Thoukydides |
| 8,750,926 B2 | 6/2014 | Fu et al. |
| 8,767,616 B2 | 7/2014 | Choi et al. |
| 8,781,519 B2 | 7/2014 | Burchill et al. |
| 8,805,303 B2 | 8/2014 | Koo et al. |
| 8,842,618 B2 | 9/2014 | Yu et al. |
| 8,897,706 B1 | 11/2014 | Lin et al. |
| 8,913,599 B2 | 12/2014 | Gonikberg et al. |
| 8,923,788 B1 | 12/2014 | Cousinard et al. |
| 8,983,557 B1 | 3/2015 | Sun et al. |
| 8,989,669 B2 | 3/2015 | Banerjea |
| 9,026,162 B2 | 5/2015 | Wagholikar et al. |
| 9,055,460 B1 | 6/2015 | Kim |
| 9,066,369 B1 | 6/2015 | Nemavat et al. |

(56) References Cited

U.S. PATENT DOCUMENTS

| | | |
|---|---|---|
| 9,125,216 B1 | 9/2015 | Choi et al. |
| 9,148,200 B1 | 9/2015 | Tsui et al. |
| 9,215,708 B2 | 12/2015 | Bhagwat |
| 9,401,737 B1 | 7/2016 | Rossi et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2004/0044489 A1 | 3/2004 | Jones et al. |
| 2004/0063403 A1 | 4/2004 | Durrant |
| 2004/0105401 A1 | 6/2004 | Lee |
| 2004/0110470 A1 | 6/2004 | Tsien et al. |
| 2004/0119545 A1 | 6/2004 | Ogiso |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0266806 A1 | 12/2005 | Soe et al. |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0214706 A1 | 9/2006 | Temple |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0254610 A1 | 11/2007 | Levy |
| 2007/0264959 A1 | 11/2007 | Carrez |
| 2007/0268862 A1 | 11/2007 | Singh et al. |
| 2007/0273458 A1 | 11/2007 | Pepper et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0088373 A1 | 4/2008 | Hong et al. |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0187072 A1* | 8/2008 | Schell et al. .................. 375/296 |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0163165 A1 | 6/2009 | Oomoto |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1 | 11/2009 | Buch et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |

(56) References Cited

U.S. PATENT DOCUMENTS

| | | |
|---|---|---|
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1 | 11/2010 | Beser |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2010/0322222 A1 | 12/2010 | Desai |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0215756 A1 | 9/2011 | Shimizu |
| 2012/0020319 A1 | 1/2012 | Song et al. |
| 2012/0025921 A1 | 2/2012 | Yang et al. |
| 2012/0039176 A1 | 2/2012 | Eshan et al. |
| 2012/0071103 A1 | 3/2012 | Kadous et al. |
| 2012/0087341 A1 | 4/2012 | Jang et al. |
| 2012/0099476 A1 | 4/2012 | Mahaffy |
| 2012/0106419 A1 | 5/2012 | Gonikberg |
| 2012/0115420 A1 | 5/2012 | Trainin |
| 2012/0195397 A1 | 8/2012 | Sayana et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0269181 A1 | 10/2012 | Gonikberg et al. |
| 2012/0274040 A1 | 11/2012 | Pani et al. |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0086630 A1 | 3/2014 | ***Kitajima et al. |
| 2014/0126552 A1 | 5/2014 | Dayal et al. |
| 2015/0237625 A1 | 8/2015 | Wagholikar et al. |

FOREIGN PATENT DOCUMENTS

| | | |
|---|---|---|
| CN | 101464939 | 6/2009 |
| CN | 102067689 | 5/2011 |
| CN | 202276343 | 6/2012 |
| EP | 1860827 | 11/2007 |
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2008093254 | 8/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Supplemental Notice of Allowance", U.S. Appl. No. 13/656,482, Nov. 29, 2013, 2 pages.

"Supplemental Notice of Allowance", U.S. Appl. No. 13/656,482, Dec. 19, 2013, 2 pages.

"Non-Final Office Action", U.S. Appl. No. 13/757,276, Jan. 30, 2014, 9 pages.

"International Search Report and Written Opinion", U.S. Appl. No. PCT/IB2013/001962, Feb. 6, 2014, 11 Pages.

"Non-Final Office Action", U.S. Appl. No. 13/536,506, Apr. 25, 2014, 12 pages.

"Corrected Notice of Allowance", U.S. Appl. No. 14/063,972, Feb. 25, 2015, 2 pages.

"Notice of Allowance", U.S. Appl. No. 13/622,916, Mar. 30, 2015, 4 pages.

"Notice of Allowance", U.S. Appl. No. 14/082,981, May 18, 2015, 7 pages.

"Restriction Requirement", U.S. Appl. No. 14/071,171, Apr. 27, 2015, 6 pages.

"Supplemental Notice of Allowance", U.S. Appl. No. 13/622,916, May 7, 2015, 2 pages.

"Final Office Action", U.S. Appl. No. 12/883,054, Jun. 9, 2014, 22 pages.

"Non-Final Office Action", U.S. Appl. No. 13/458,227, Jul. 3, 2014, 10 pages.

"Non-Final Office Action", U.S. Appl. No. 13/911,979, Jun. 9, 2014, 11 pages.

"Non-Final Office Action", U.S. Appl. No. 14/082,981, Aug. 4, 2014, 6 pages.

"Non-Final Office Action", U.S. Appl. No. 14/089,515, May 13, 2014, 9 pages.

"Notice of Allowance", U.S. Appl. No. 13/757,276, Jul. 8, 2014, 6 pages.

"Non-Final Office Action", U.S. Appl. No. 12/883,054, Sep. 11, 2014, 29 pages.

"Non-Final Office Action", U.S. Appl. No. 13/622,916, Sep. 10, 2014, 10 pages.

"Non-Final Office Action", U.S. Appl. No. 14/063,972, Sep. 24, 2014, 6 pages.

"Notice of Allowance", U.S. Appl. No. 13/536,506, Sep. 19, 2014, 7 pages.

"Notice of Allowance", U.S. Appl. No. 14/063,972, Nov. 7, 2014, 8 pages.

"Notice of Allowance", U.S. Appl. No. 14/089,515, Aug. 21, 2014, 4 pages.

"Supplemental Notice of Allowance", U.S. Appl. No. 13/757,276, Oct. 24, 2014, 2 pages.

(56) References Cited

OTHER PUBLICATIONS

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.
Jung, et al.,"A Power Control MAC Protocol for Ad Hoc Networks", In Proceedings of MOBICOM 2002, Sep. 23, 2002, pp. 36-47.
"Advisory Action", U.S. Appl. No. 12/646,721, Aug. 13, 2013, 3 pages.
"Advisory Action", U.S. Appl. No. 12/190,251, Dec. 7, 2011, 3 pages.
Mazzanti, et al.,"Analysis and Design of Injection-Locked LC Dividers for Quadrature Generation", IEEE Journal of Solid-State Circuits, vol. 39, No. 9, Sep. 2004, pp. 1425-1433.
"Draft Standard for Information Technology—Telecommunications and information exchange between systems—Local and metropolitan area networks—Specific requirements", IEEE P802.11s/D1.03, Apr. 2007, 251 pages.
"Final Office Action", U.S. Appl. No. 12/759,336, Feb. 25, 2013, 11 pages.
"Final Office Action", U.S. Appl. No. 12/358,955, Mar. 18, 2013, 12 pages.
"Final Office Action", U.S. Appl. No. 12/534,361, Feb. 29, 2012, 13 pages.
"Final Office Action", U.S. Appl. No. 12/646,802, Nov. 15, 2012, 15 pages.
"Final Office Action", U.S. Appl. No. 12/190,251, Sep. 13, 2011, 15 pages.
"Final Office Action", U.S. Appl. No. 12/646,721, Jun. 6, 2013, 16 pages.
"Final Office Action", U.S. Appl. No. 12/484,563, Apr. 24, 2012, 18 pages.
"Final Office Action", U.S. Appl. No. 12/616,454, Apr. 11, 2012, 19 pages.
"Final Office Action", U.S. Appl. No. 12/186,429, Oct. 13, 2011, 23 pages.
"Final Office Action", U.S. Appl. No. 12/542,845, Sep. 25, 2012, 23 pages.
"Final Office Action", U.S. Appl. No. 12/358,955, Feb. 17, 2012, 26 pages.
"Final Office Action", U.S. Appl. No. 12/323,292, Aug. 24, 2012, 26 pages.
"Final Office Action", U.S. Appl. No. 12/487,425, May 3, 2012, 9 pages.
"Foreign Office Action", Chinese Application No. 200980122587.0, Sep. 10, 2013, 11 Pages.
"Foreign Notice of Allowance", Japanese Application No. 2011-513586, Jul. 16, 2013, 2 pages.
"Foreign Office Action", Chinese Application No. 200980122587.0, Feb. 21, 2013, 17 pages.
"Foreign Office Action", European Patent Application No. 09789754.0, Mar. 11, 2013, 4 Pages.
"Foreign Office Action", Japanese Application No. 2011-513586, Apr. 9, 2013, 4 Pages.
"Foreign Office Action", European Patent Application No. 09789754.0, Jul. 12, 2012, 4 pages.
"Foreign Office Action", Japanese Application No. 2011-513586, Oct. 23, 2012, 7 pages.
"Foreign Office Action", EP Application No. 09789754.0, May 17, 2011, 8 pages.
"Further Higher Data Rate Extension in the 2.4 GHz Band", IEEE P802.11g/D8.2,DRAFT Supplement to STANDARD [for] Information Technology, Apr 2003, 69 pages.
Haas, et al.,"Gossip-Based Ad Hoc Routing", IEEE/ACM Transactions on Networking, vol. 14, No. 3, Jun. 2006, pp. 479-491.
"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993), Oct. 14, 2003, 80 pages.
Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
"International Search Report and Written Opinion", PCT Application PCT/US2012/035597, Aug. 6, 2012, 13 pages.
"Non-Final Office Action", U.S. Appl. No. 12/167,841, Jul. 15, 2011, 10 pages.
"Non-Final Office Action", U.S. Appl. No. 12/534,361, Oct. 12, 2011, 11 pages.
"Non-Final Office Action", U.S. Appl. No. 12/190,251, Mar. 29, 2012, 11 pages.
"Non-Final Office Action", U.S. Appl. No. 13/099,169, Mar. 28, 2013, 12 pages.
"Non-Final Office Action", U.S. Appl. No. 13/429,090, Oct. 24, 2013, 13 pages.
"Non-Final Office Action", U.S. Appl. No. 12/484,563, Oct. 4, 2011, 13 pages.
"Non-Final Office Action", U.S. Appl. No. 12/759,336, Oct. 4, 2012, 13 pages.
"Non-Final Office Action", U.S. Appl. No. 12/732,036, Aug. 9, 2012, 13 pages.
"Non-Final Office Action", U.S. Appl. No. 13/479,124, Sep. 27, 2013, 14 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/235,333, Jun. 28, 2011, 16 pages.
"Non-Final Office Action", U.S. Appl. No. 12/646,802, Mar. 29, 2012, 16 pages.
"Non-Final Office Action", U.S. Appl. No. 12/323,292, Dec. 21, 2011, 17 pages.
"Non-Final Office Action", U.S. Appl. No. 12/478,446, Dec. 28, 2011, 17 pages.
"Non-Final Office Action", U.S. Appl. No. 12/883,054, Nov. 22, 2013, 18 pages.
"Non-Final Office Action", U.S. Appl. No. 13/656,482, Mar. 19, 2013, 19 pages.
"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/358,955, Sep. 6, 2011, 24 pages.
"Non-Final Office Action", U.S. Appl. No. 12/542,845, Oct. 23, 2013, 29 pages.
"Non-Final Office Action", U.S. Appl. No. 12/358,955, Aug. 20, 2012, 33 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/487,425, Jan. 12, 2012, 7 pages.
"Non-Final Office Action", U.S. Appl. No. 12/190,240, Jan. 6, 2012, 7 pages.
"Non-Final Office Action", U.S. Appl. No. 12/616,454, Dec. 22, 2011, 8 pages.

(56) References Cited

OTHER PUBLICATIONS

"Non-Final Office Action", U.S. Appl. No. 12/190,251, Mar. 29, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 13/656,502, Jun. 25, 2013, 11 pages.
"Notice of Allowance", U.S. Appl. No. 12/167,841, Nov. 25, 2011, 11 pages.
"Notice of Allowance", U.S. Appl. No. 12/534,361, Feb. 14, 2013, 12 pages.
"Notice of Allowance", U.S. Appl. No. 12/190,240, May 16, 2012, 4 pages.
"Notice of Allowance", U.S. Appl. No. 12/616,454, Aug. 22, 2012, 4 pages.
"Notice of Allowance", U.S. Appl. No. 12/235,333, Nov. 15, 2011, 5 pages.
"Notice of Allowance", U.S. Appl. No. 13/604,563, Sep. 26, 2013, 5 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 13/656,482, Sep. 3, 2013, 8 pages.
"Notice of Allowance", U.S. Appl. No. 12/759,336, May 3, 2013, 9 pages.
"Notice of Allowance", U.S. Appl. No. 12/186,429, Jun. 6, 2013, 9 pages.
"Notice of Allowance", U.S. Appl. No. 12/487,425, Jul. 26, 2013, 9 pages.
"Part 11: Wireless LAN Medium Access Control (MAC) and Physical Layer (PHY) specifications", IEEE Std 802.11b-1999/Cor Jan. 2001 ,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—,IEEE, Apr. 2003, pp. 1-69.
"PCT Search Report", Application No. PCT/US2009/046289, Oct. 29, 2009, 13 pages.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/186,429, Jul. 10, 2013, 2 pages.
"Supplemental Notice of Allowance", U.S. Appl. No. 12/759,336, Aug. 14, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/716,569, Jul. 23, 2012, 2 pages.
"Supplemental Notice of Allowance", U.S. Appl. No. 12/358,955, Oct. 11, 2013, 3 pages.
Mujtaba "TGn Sync Proposal Technical Specification", IEEE 802.11-04/0889r6, This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
"Corrected Notice of Allowance", U.S. Appl. No. 14/063,972, Jan. 26, 2015, 2 pages.
"Non-Final Office Action", U.S. Appl. No. 13/761,949, Jan. 12, 2015, 16 pages.
"Non-Final Office Action", U.S. Appl. No. 14/082,981, Feb. 13, 2015, 13 pages.
"Notice of Allowance", U.S. Appl. No. 12/883,054, Feb. 9, 2015, 12 pages.
"Notice of Allowance", U.S. Appl. No. 13/458,227, Jan. 2, 2015, 7 pages.
"Notice of Allowance", U.S. Appl. No. 13/911,979, Nov. 20, 2014, 12 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, Mar. 2012, 302 pages.
"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmbD10.0 as amended by IEEE 802.11ae D5.0 and IEEE 802.11aa 06.0); Draft Standard for Information Technology Telecommunications and Information Exchange, Sep. 2011, 601 pages.
"Amendment 4: TV White Spaces Operation", The Institute of Electrical and Electronics.
Engineers, Inc., IEEE Std P802.11af/D1.05 Draft Standard for Information Technology—Telecommunications and Information Exchange Between Systems—Local and Metropolitan area networks—Specific Requirements, Part 11: Wireless LAN Medium Access Control (MAC) and Physical Layer, Nov. 2011, 123 Pages.
"Amendment 5: Enhancements for Very High Throughput for Operation in Bands below 6 GHz", Prepared by the 802.11 Working Group of' the 802 Committee, IEEE P802.11 ac™/D0.2 Draft STANDARD for Information Technology—IEEE P802.11ac/D0.2. Mar. 2011 Telecommunications and information exchange between systems—Local and metropolitan area networks Specific requirements Part 11: Wireless LAN Medium Access Co, Mar. 2011, 184 Pages.
"Amendment 5: Protected Management Frames", Prepared by: IEEE 802 Committee of the IEEE Computer Society, P802.11w™/D4.0 Draft Standard for Information Technology—Telecommunications and information exchange between systems—Local and metropolitan area networks—Specific requirements—Part 11:

(56) References Cited

OTHER PUBLICATIONS

Wireless LAN Medium Access Control (MAC) and Physical Layer (PHY) spec, Nov. 2007, 63 Pages.
"Amendment 6: Medium Access Control (MAC) Security Enhancements", Prepared by the LAN/MAN Standards Committee of the IEEE Computer Society, IEEE Standard for Information Technology Telecommunications and information exchange between systems—Local and metropolitan area networks Specific requirements Part 11: Wireless LAN Medium Access Control (MAC) and Physical Layer (PHY) specifications, Jul. 23, 2004, 190 Pages.
"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.
"Amendment 7: Medium Access Control (MAC) Quality of Service (QoS) Enhancements", Prepared by the LAN/MAN Standards Committee of the IEEE Computer Society, IEEE Standard for Information Technology—Telecommunications and information exchange between systems—Local and metropolitan area networks Specific requirements Part 11: Wireless Medium Access Control, Oct. 2004, 195 Pages.
"Amendment 8: IEEE 802.11 Wireless Network Management", Prepared by the LAN/MAN Standards Committee of the IEEE Computer Society, Draft Standard for Information technology Telecommunications and information exchange between systems—Local and metropolitan area networks Specific requirements—Part 11: Wireless LAN Medium Access Control (MAC) and Physical Layer (PHY) specifications, Aug. 2010, 426 Pages.
"Higher-Speed Physical Layer Extension in the 2.4 GHz Band", LAN/MAN Standards Committee of the IEEE Computer Society, IEEE Std 802.11b Supplement to Standard for.
Information Technology—Telecommunications and Information Exchange Between Systems—Local and Metropolitan area networks—Specific Requirements, Part 11: Wireless LAN Medium Access Control (MAC) and Physical Layer, Sep. 16, 1999, 96 Pages.

"IEEE P802.11ac (TM) / D2.0", Draft STANDARD for Information Technology—Telecommunications and information exchange between systems—Local and metropolitan area networks—Specific Requirements / Part 11: Wireless LAN Medium Control (MAC) and Physical Layer (PHY) specifications / Am, Jan. 2012, 359 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k—2008, Jun. 12, 2008, 244 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11—2012, Mar. 29, 2012, 2793 pages.
"Non-Final Office Action", U.S. Appl. No. 14/071,171, Sep. 1, 2015, 13 pages.
"Notice of Allowance", U.S. Appl. No. 13/761,949, Jul. 28, 2015, 8 pages.
"Supplemental Notice of Allowance", U.S. Appl. No. 13/622,916, Jul. 10, 2015, 2 pages.
"Supplemental Notice of Allowance", U.S. Appl. No. 14/082,981, Aug. 25, 2015, 6 pages.
Gunman, "Multi-Rate Layered Decoder Architecture for Block LDPC Codes of the IEEE 802.11n Wireless Standard", Department of Electrical and Computer Engineering Texas A&M University, 2007, 4 Pages.
"Notice of Allowance", U.S. Appl. No. 14/702,000, Sep. 25, 2015, 13 pages.
"Corrected Notice of Allowance", U.S. Appl. No. 13/761,949, Nov. 20, 2015, 2 pages.
"Foreign Office Action", CN Application No. 201380035321.9, Jan. 14, 2016, 12 Pages.
"Notice of Allowance", U.S. Appl. No. 14/071,171, Mar. 4, 2016, 10 pages.
Corrected Notice of Allowance, U.S. Appl. No. 14/071,171, Apr. 28, 2016, 2 pages.
Corrected Notice of Allowance, U.S. Appl. No. 14/071,171, Jun. 21, 2016, 2 pages.

* cited by examiner

SHAPING NEAR-FIELD TRANSMISSION SIGNALS

RELATED APPLICATION

This present disclosure claims priority under 35 U.S.C. §119(e) to U.S. Provisional Patent Application Ser. No. 61/667,107 filed Jul. 2, 2012, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communications between computing devices or circuits are often transmitted as modulated radio frequency (RF) fields. A transmitting device typically encodes a signal with data for transmission to a receiving device. The data signal is then up-converted and transmitted, via an antenna, as an RF field to the receiving device. The antenna of the transmitting device, however, may be subject to a mutual inductance with an antenna of the receiving device. While this mutual inductance may facilitate transmission of the data to the receiving device, variances in the mutual inductance often influence or distort the transmission signals or RF field generated by the transmitting device.

The distortions caused by the variable mutual inductance can compromise the integrity of the RF field that transmits the data signal, resulting in disrupted communication or data loss. Typical solutions for reducing these distortions of the RF field often rely on decreasing a quality factor of the antenna by adding resistors to an antenna interface circuit.

SUMMARY

This summary is provided to introduce subject matter that is further described below in the Detailed Description and Drawings. Accordingly, this Summary should not be considered to describe essential features nor used to limit the scope of the claimed subject matter.

A method is described for shaping a baseband data signal based on a coupling condition of an antenna, modulating a radio frequency (RF) carrier signal with the shaped baseband data signal to provide a shaped transmission signal, and applying the shaped transmission signal to the antenna to generate an RF field. The shaped transmission signal can be effective to reduce distortion of the RF field associated with the coupling condition of the antenna.

A circuit is described that includes components configured to shape, based on a coupling condition of an antenna, a baseband data signal, a modulator configured to modulate an RF carrier signal with the shaped baseband data signal to provide a shaped transmission signal, and a transmitter configured to transmit the shaped transmission signal via the antenna to generate an RF field, the shaped transmission signal effective to reduce distortions of the RF field due to the coupling condition of the antenna.

A System-on-Chip is described that includes a signal-shape controller that is configured to calculate, based on a coupling condition of an antenna, parameters for shaping a baseband data signal and shape the baseband data signal based on the parameters effective to provide a shaped transmission signal that, when transmitted via the antenna, creates an RF field having reduced coupling condition-related distortion.

The details of one or more implementations are set forth in the accompanying drawings and the description below. Other features and advantages will be apparent from the description and drawings.

BRIEF DESCRIPTION OF THE DRAWINGS

Aspects of shaping near-field transmission signals are described with reference to the following figures. In the figures, the left-most digit of a reference number identifies the figure in which the reference number first appears. The use of the same reference numbers in different instances in the description and the figures indicate like elements.

DETAILED DESCRIPTION

Figure 1:
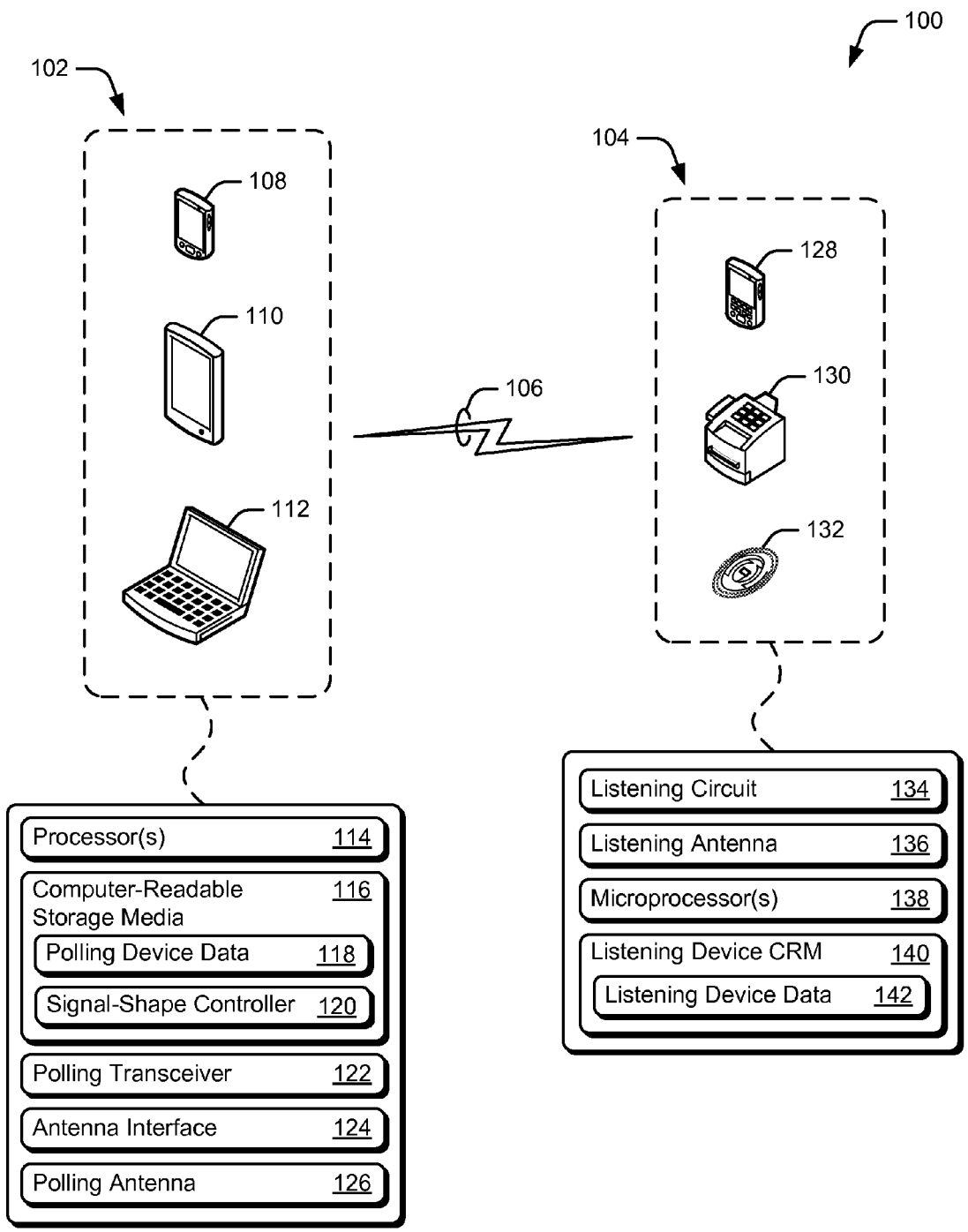
FIG. 1 illustrates an operating environment in which aspects of shaping near-field transmission signals can be implemented.

Conventional techniques for reducing RF field distortion caused by varying coupling conditions, such as reducing a quality factor of an antenna, often compromise communication capabilities of a transceiver. For example, adding quality factor-lowering resistors to an antenna network decreases transmitter power efficiency, decreases receiver sensitivity, and/or reduces frequency selectivity of a transmitter associated with the antenna network. This disclosure describes apparatuses and techniques for shaping short-range transmission signals, which are effective to reduce coupling condition-related RF field distortion.

By way of example, consider two devices implementing near-field communication (NFC) to transmit data. In NFC a first device (e.g., polling device) actively transmits signals to a second device (e.g., listening device). To do so, the first device produces a high frequency alternating magnetic field which couples to the second device placed in an approximate operating volume. During this transmission, the first device modulates the amplitude of the alternating magnetic field with pulses, also referred to as encoding via amplitude shift keying (ASK).

For data transmissions in the approximate operating volume, it is often desirable to have a modulated field envelope that complies with communication requirements, such as those describing amplitude, slew rates, rise/fall times, and/or general shape. These requirements are typically defined by communication standards or specifications, and compliancy with the requirements often ensures that modulation characteristics of the signal, or associated transmission field, are within receiving capabilities of a listening device.

The coupling between the two devices (e.g., polling and listening devices), however, can depend on different factors, such as shapes of respective device antennas, relative device positioning in the approximate operating volume, or even movement of the devices during transmission. Some of these factors, or changes thereof, may affect or distort characteristics of the modulated field envelope, sometimes to such an extent as to cause the envelope of the modulated field to be non-compliant with the afore-mentioned requirements.

The apparatuses and techniques described herein may enable a shape of the modulated field envelope of the transmitted signal to be controlled or adjusted in such a way as to compensate for the effect of various coupling factors or conditions. By so doing, an envelope of the modulated field envelope may be shaped to comply with the requirements set by the communication standards or specifications. In at least some aspects, shaping of the modulated field is performed in a baseband signal, prior to modulation, using ramp generator and/or a filter, either of which may be programmable.

In some cases, shaping parameters applied to the ramp generator and/or filter may be fixed. These fixed parameters may be determined via simulation or experimentation, and optimized for a wide variety of coupling conditions. In other cases, the shaping parameters may be decided dynamically or on the fly, based on feedback provided by a transmitter that is generating the modulated field. Using a ramp generator and/or filter to shape the baseband signal enables transmission of a shaped modulated field that is able to meet communication requirements. Alternately or additionally, the use of feedback (dynamic or otherwise) may enable the techniques described herein to be applied to a variety of antennas dimensions, form factors, and to coupling conditions of the system. In some cases, these techniques allow a polling device to dynamically adapt to an environment of changing coupling conditions.

In at least some aspects of shaping short-range transmission signals, a baseband data signal is shaped based on a coupling condition of an antenna. A radio frequency (RF) carrier signal is modulated with the shaped baseband data signal to provide a shaped transmission signal. The shaped transmission signal is then transmitted, via the antenna, to generate an RF field for transmission of data. By so doing, the distortions of the RF field due to the coupling condition of the antenna are reduced without modifying an antenna network, which preserves transmitter efficiency, receiver sensitivity, and frequency selectivity.

The following discussion describes an operating environment, techniques that may be employed in the operating environment, and a System-on-Chip (SoC) in which components of the operating environment can be embodied. In the discussion below, reference is made to the operating environment by way of example only.

FIG. 1 illustrates an example operating environment 100 in which aspects of shaping short-range transmission signals can be implemented. As shown in FIG. 1, the example operating environment 100 includes polling devices 102, listening devices 104, and a wireless communication link 106 (communication link 106). In at least some aspects, a polling device 102 and a listening device 104 are configured for near-field communication (NFC) via communication link 106, which is implemented as mutual inductance between the devices. Alternately or additionally, polling device 102 and listening device 104 may be configured for other types of short-range communication.

Polling devices 102 are each capable of communicating, accessing, presenting, and/or processing various data, such as data accessed via communication link 106. In some cases, polling devices 102 may also be referred to as pollers or polling devices. Polling devices 102 include a smart-phone 108, tablet computer 110, and laptop computer 112. Although not shown, other configurations of polling devices 102 are also contemplated, such as a desktop computer, ultrabook, netbook, server, point-of-sale terminal, mobile-internet device (MID), gaming console, mobile hotspot, networked media player, and so on.

Each polling device 102 includes processor(s) 114 (e.g., an application processor) and computer-readable storage media 116 (CRM 116). Processor 114 may include any suitable number and/or type of processing cores, which may be configured in any suitable manner. CRM 116 may include any suitable type and/or combination of volatile memory and non-volatile memory (not shown), such as random-access memory (RAM), static random access memory (SRAM), dynamic random-access memory (DRAM), double-data-rate RAM (DDR), and the like.

CRM 116 includes polling device data 118 and signal-shape controller 120, which in one implementation, is embodied on CRM 116. Polling device data 118 may comprise operating systems, applications, or user data (not shown) of polling device 102. The operating systems or applications of the polling device 102 may be stored by, or executed from, the volatile memory or the non-volatile memory of CRM 116. The implementation and use of signal-shape controller 120 varies and is described below.

Polling devices 102 also include polling transceiver 122, antenna interface 124, and polling device antenna 126 (polling antenna), which provide an interface for communicating with a listening device 104 via communication link 106. The communication of a polling device 102 and listening device 104 varies and is described in greater detail below. Polling transceiver 122 may be configured for any suitable type of communication, such as near-field communication (NFC). Antenna interface 124 includes components enabling polling transceiver 122 to be operably coupled with polling antenna 126. For example, antenna interface 124 may be a matching network configured to match an impedance of polling transceiver 122 with an impedance of polling antenna 126.

Polling device 102 communicates with listening device 104 via communication link 106. In at least some aspects, communication link 106 is implemented via near-field communication (NFC), in which data is communicated by a modulated RF field between polling device 102 and listening device 104.

Polling device 102 can initiate NFC communication with a listening device 104, which then provides data, information, or other useful services. In this particular example, the listening devices may include a full-featured device (active), such as listening smart-phone 128 or point-of-sale terminal 130. Alternately, listening device 104 may be implemented as a listening circuit having a reduced-feature set (passive), such as NFC chip 132 or radio frequency identification (RFID) tag, which store identification data or user information. In some cases, listening device 104 may be referred to as a listener, listener circuit, or listener device.

Each listening device 104 includes a listening device circuit 134 (listening circuit 134) and a listening device antenna 136 (listening antenna 136), which provide an interface for communicating with polling device 102 via communication link 106. Communication link 106 may be configured for any suitable type of communication, such as NFC. The communication of polling device 102 and listening device 104 is described in greater detail below.

A listening device may also include microprocessor(s) 138 and listening device computer-readable storage media 140 (listening device CRM 140). Microprocessors 138 may include any suitable number and/or type of processing cores, which can be configured in any suitable manner. Listening device CRM 140 may include any suitable type and/or combination of volatile memory and non-volatile memory (not shown), such as RAM, SRAM, Flash, and the like. Listening device CRM 140 stores listening device data 142, which may include code, firmware, operating system, applications, or other data of listening device 104.

Figure 2:
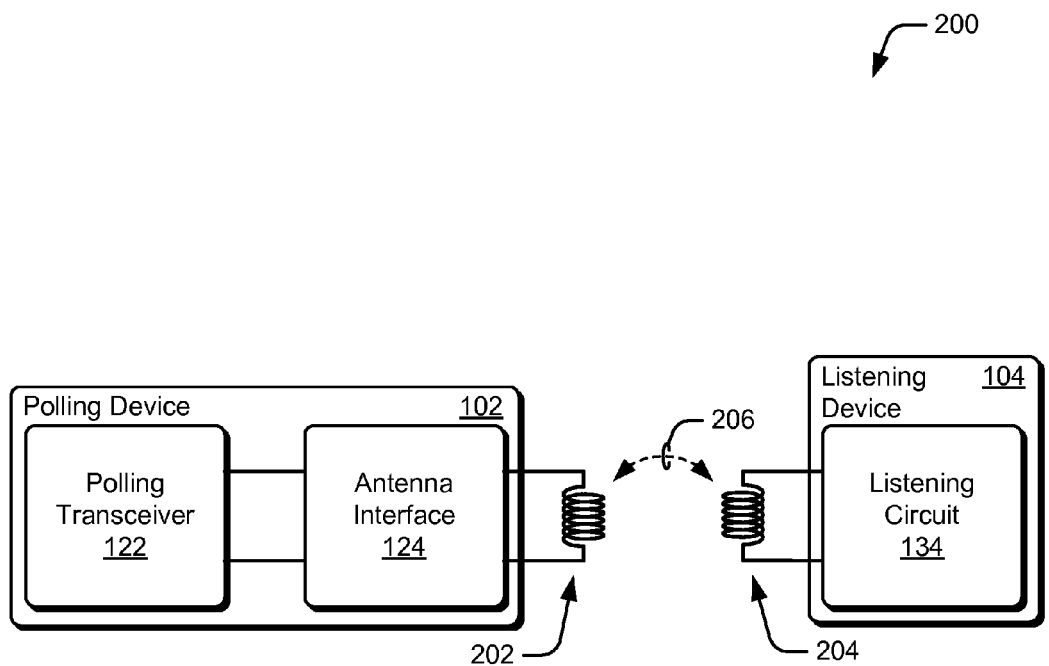
FIG. 2 illustrates an example near-field communication network in accordance with one or more aspects.

FIG. 2 illustrates an example near-field communication network 200 in which aspects of shaping near-field transmission signals can be implemented. The example near-field communication network 200 includes polling device 102 and listening device 104, such as those described with reference to FIG. 1. Typically, a polling device will generate a modulated RF field to power and/or communicate data to a listening device. In this particular example, polling transceiver 122 encodes data of polling device 102 as a baseband data signal. Polling transceiver 122 may encode the data using any suitable encoding scheme, such as a 10% or 100% amplitude shift keying (ASK). Polling transceiver 122 then modulates an RF carrier signal with the baseband data signal to provide a transmission signal. The transmission signal is then sent through antenna interface 124 to polling device antenna 202 (polling antenna 202), such as polling antenna 126 as described with reference to FIG. 1.

Here, polling antenna 202 and listening device antenna 204 (listening antenna 204) are illustrated as inductors having a mutual inductance 206. Applying the transmission signal (e.g., current) to polling antenna 202 generates a modulated radio frequency (RF) field. This modulated RF field, via mutual inductance 206, excites current flow in listening antenna 204, which is received by listening circuit 134. It should be noted that mutual inductance 206 is affected by coupling conditions between polling device 102 and listening device 104, such as geometry of polling antenna 202, geometry of listening antenna 204, and their relative position or orientation with respect to each other. Thus, mutual inductance 206 between a polling device and listening device may vary depending on configurations of the respective devices and their positions relative to each other.

Figure 3:
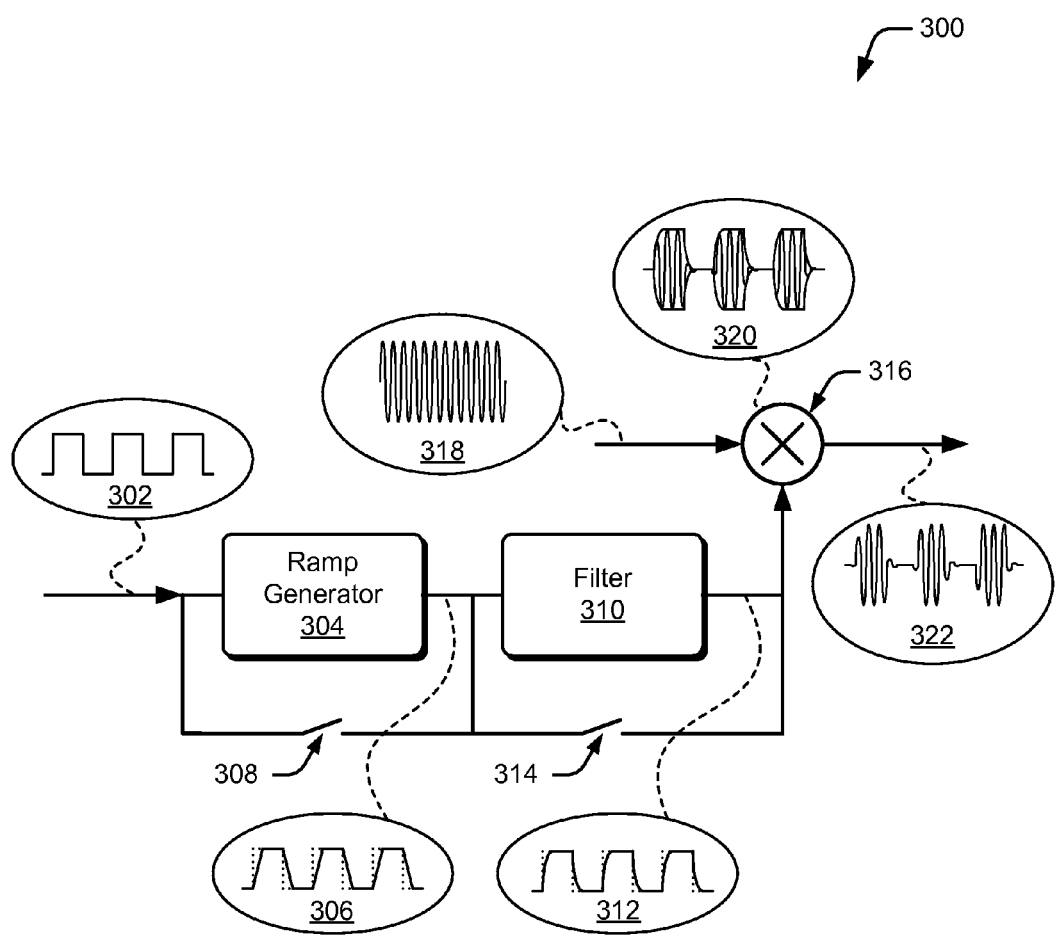
FIG. 3 illustrates example components which may implement aspects of shaping near-field transmission signals.

FIG. 3 illustrates, at 300, example components which may implement aspects of shaping near-field transmission signals. These components may be implemented in association with any suitable entity of polling device 102, such as polling transceiver 122. In this particular example, the example components receive baseband data signal 302 from a baseband processor or other data source of polling device 102.

Here, as shown in FIG. 3, baseband data signal 302 is encoded using 100% ASK encoding, although alternate encodings (e.g., 10% ASK) may be implemented without departing from the spirit of this disclosure. Ramp generator 304 ramps the transitions of baseband data signal 302 to provide a ramped baseband data signal 306. Ramp generator 304 ramps the baseband data signal using a slew rate that may be pre-programmed, fixed (e.g., default), or adjusted dynamically depending on coupling conditions of an antenna. Alternately or additionally, operations of ramp generator 304 can be bypassed using switch 308, which enables progression of a partially ramped or un-ramped baseband signal.

The baseband data signal proceeds from ramp generator 304 or switch 308 to filter 310, which filters the baseband data signal to provide (or generate) a filtered baseband data signal 312. Filter 310 filters the baseband data signal using a time-constant that may be fixed (e.g., default) or adjusted dynamically based on coupling conditions of an antenna. Alternately or additionally, operations of filter 310 can be bypassed using switch 314, which enables progression of a partially filtered or un-filtered baseband signal. Ramping and/or filtering the baseband data signal is effective to shape the baseband data signal. In some aspects shaping the baseband data signal is based on a coupling condition of an antenna by which the signal is transmitted.

Modulator 316 modulates radio frequency (RF) carrier signal 318 with the shaped baseband data signal as shown at 320. This modulation of RF carrier signal 318 provides shaped transmission signal 322, which can be applied to an antenna or antenna interface. Shaping the baseband data signal instead of an RF transmission signal can be effective to preserve transmitter efficiency. This can be effective to compensate for, or control, signal distortions, such as overshoot, signal ringing, or signal rise or fall times in the antenna to which the shaped transmission signal is applied.

Figure 4:
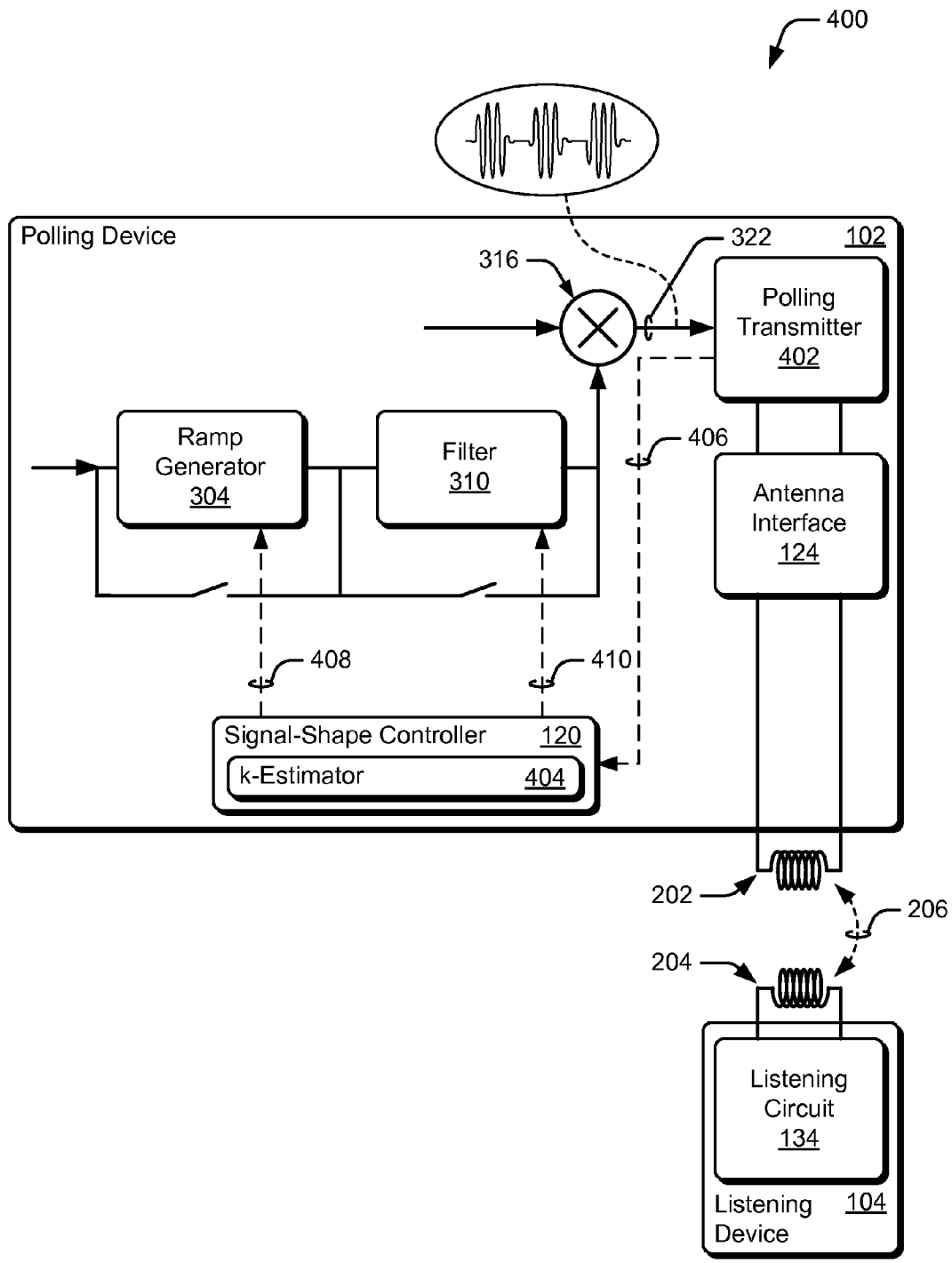
FIG. 4 illustrates another example of near-field communication in accordance with one or more aspects.

FIG. 4 illustrates another example near-field communication network 400 in which aspects of shaping near-field transmission signals can be implemented. This example near-field communication network 400 includes polling device 102 and listening device 104, such as those described with reference to FIG. 1. In this particular example, polling device 102 includes various components which may implement aspects of shaping near-field transmission signals. Some of these components, such as ramp generator 302, filter 310, and modulator 316 may be implemented as those components described with reference to FIG. 3. In the context of this example, polling transmitter 402 receives the shaped transmission signal 322 from modulator 316.

Here, polling device 102 also includes polling transmitter 402 and coupling condition estimator 404 (k-estimator 404), which in this particular example, is embodied as part of signal-shape controller 120. Signal-shape controller 120 enables, in at least some aspects, adaptive or dynamic shaping of near-field transmission signals. K-estimator 404 is configured to estimate coupling conditions of an antenna, such as characteristics of mutual inductance 206 associated with listening antenna 202. To do so, k-estimator 404 receives feedback 406 from polling transmitter 402, which may be transmitting or preparing to transmit. In some cases, feedback 406 is generated by monitoring a phase of voltage or current waveform in polling transmitter 402. Alternately or additionally, feedback 406 may be determined by k-estimator 404 by sensing current amplitude in polling transmitter 402.

Signal-shape controller 120 can determine parameters for shaping baseband data signals based on feedback 406. In some cases, signal-shape controller 120 uses default parameters for shaping baseband data signals. In such cases, the default parameters may be based on simulations and/or optimized for a variety of different coupling conditions. Signal-shape controller 120 determines ramping parameters 408 and filtering parameters 410, which are sent to ramp generator 304 and filter 310, respectively.

Ramp generator 304 and filter 310 then shape, based on the respective parameters, a baseband data signal. This shaped baseband data signal is then modulated with an RF carrier signal by modulator 316 to provide transmission signal 322, such as described above with reference to FIG. 3. Polling transmitter 402 then applies the shaped transmission signal to polling antenna 202 via antenna interface 124. The shaped transmission signal creates a modulated RF field between polling antenna 202 and listening antenna 204, communicated data of polling device 102 to listening device 104. Because the coupling conditions between polling antenna 202 and listening antenna 204 are taken into account by signal-shape controller 120, an RF field generated at polling antenna 202 by the shaped transmission is less affected by distortion caused by the coupling conditions. This can be effective to compensate for, or to control, signal rise or fall times in the antenna resulting in reduced signal over-shoot and/or signal ringing while providing a transmission RF field that is compliant with NFC specifications (e.g., an RF field that satisfies specified rise and fall time requirements).

Figure 5:
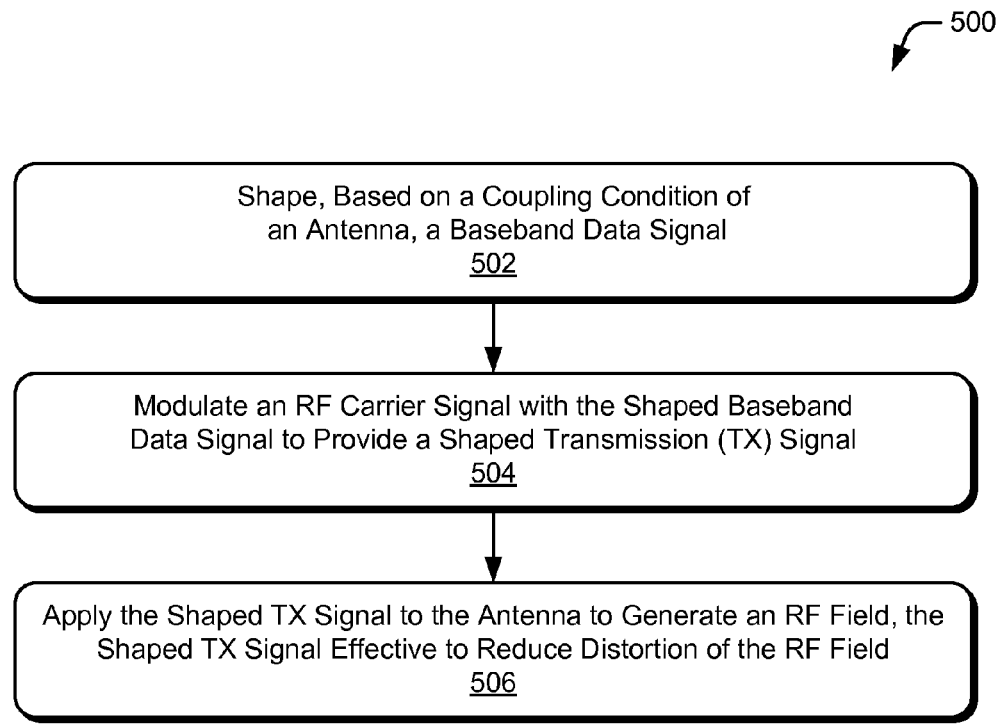
FIG. 5 illustrates an example method of shaping near-field transmission signals in accordance with one or more aspects.

FIG. 5 illustrates an example method 500 of shaping near-field transmission signals in accordance with one or more aspects. The following discussion describes techniques for shaping near-field transmission signals. These techniques can be implemented using the previously described environment or entities, such as signal-shape controller 120 of FIG. 1 or k-estimator 404 FIG. 4 embodied in a polling device. These techniques include methods illustrated in FIGS. 5, 7, and 8, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2-4 by way of example. Such reference is not to be taken as limited to operating environment 100 but rather as illustrative of one of a variety of examples.

At 502, a baseband data signal is shaped based on a coupling condition of an antenna. In some aspects, the baseband data signal is shaped using a ramp generator or filter. The coupling condition of the antenna may be estimated, determined by experimentation (e.g., simulations and/or prototyping), or actively measured, such as by receiving feedback from a transmitter operably connected to the antenna. In some cases, the coupling condition of the antenna is associated with the antenna's mutual inductance with another antenna of a device or circuit.

As an example, consider method 500 in the context of operating environment 100 of FIG. 1. Assume that a user of smart phone 108 is attempting to complete a transaction for merchandise via point-of-sale (POS) terminal 130. Also assume that smart phone 108 is positioned approximately five millimeters (e.g., one to ten millimeters) from POS terminal 130 and that smart phone 108 has already transmitted some data to POS terminal 130 at this distance. Here, signal-shape controller 120 shapes a baseband signal encoding additional data to be transmitted to POS terminal 130. To do so, signal-shape controller 120 generates shaping parameters based on feedback received from polling transceiver 122 (or a transmitter thereof). This feedback permits signal-shape controller 120 to characterize or estimate the coupling conditions of polling antenna 126. Alternately, signal-shape controller 120 may be pre-programmed with shaping parameters that are optimized for a wide variety of coupling conditions.

At 504, an RF carrier signal is modulated with the shaped baseband data signal. The RF carrier signal may be modulated using any suitable means, such as modulator 316 as described with reference to FIG. 3. This is effective to provide a shaped transmission signal at a frequency of the RF carrier signal. By so doing, the addition of lossy elements (e.g., Q-factor reducing resistors) can be avoided, thereby preserving transmitter efficiency.

In the context of the present example, an RF carrier of smart phone 108 is modulated, via modulator 316, with the shaped based band signal that encodes the additional data to be transmitted to POS 130. This is effective to provide a shaped transmission signal encoding the additional data, such as shaped transmission signal 322 as described with reference to FIG. 3.

At 506, the shaped transmission signal is applied to an antenna to generate an RF field. The shaped transmission signal is effective to reduce distortion of the RF field caused by the coupling condition of the antenna. For example, the shaped transmission signal may have reduced signal over-shoot, less signal ringing, or improved signal rise or fall times versus a non-shaped transmission signal.

Figure 6:
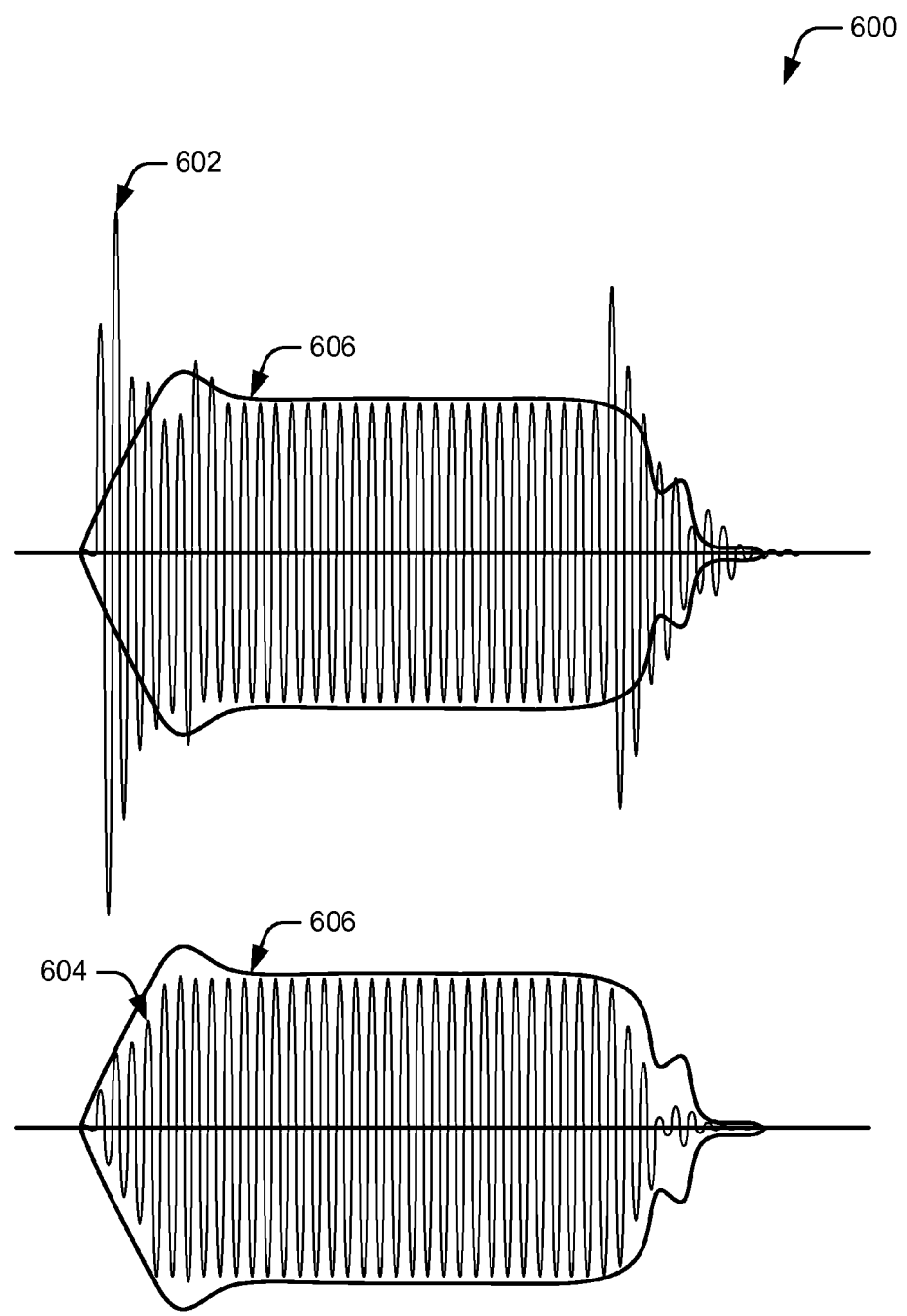
FIG. 6 illustrates example near-field signal profiles, including a signal profile of a shaped near-field transmission signal.

An example of signal improvement is shown in FIG. 6, which illustrates examples of near-field signal profiles at 600. Assume that both signal profile 602 and signal profile 604 are generated via an antenna subjected to identical coupling conditions, and therefor identical RF distortion. Signal profile 602 is generated by a non-shaped transmission signal, the profile (e.g., current profile) of which violates a specified signal envelope 606, which is but one example of a specified signal envelope or requirement.

These violations are shown as signal over-shoot and signal ringing, which are caused by varying coupling conditions (RF distortions) to which a transmitting antenna is subjected. Alternately, signal profile 604 is generated by a shaped transmission signal, examples of which are described herein. As shown at 600, signal profile 604 does not violate the specified signal envelope 606 despite being subjected to the same coupling condition. Thus, in at least some cases, shaping near-field transmission signals results in improved communication for NFC enabled devices.

Concluding the present example, polling transceiver 122 of smart phone 108 applies the shaped transmission signal to polling antenna 126 via antenna interface 124. Application of the shaped transmission signal to polling antenna 126 generates an RF field modulated with the additional data for POS terminal 130. Here, the signal generated in polling antenna 126, and thus the RF field, suffers minimal distortions associated with the coupling conditions because the transmission signal is shaped to compensate for such (e.g., signal profile 604).

Figure 7:
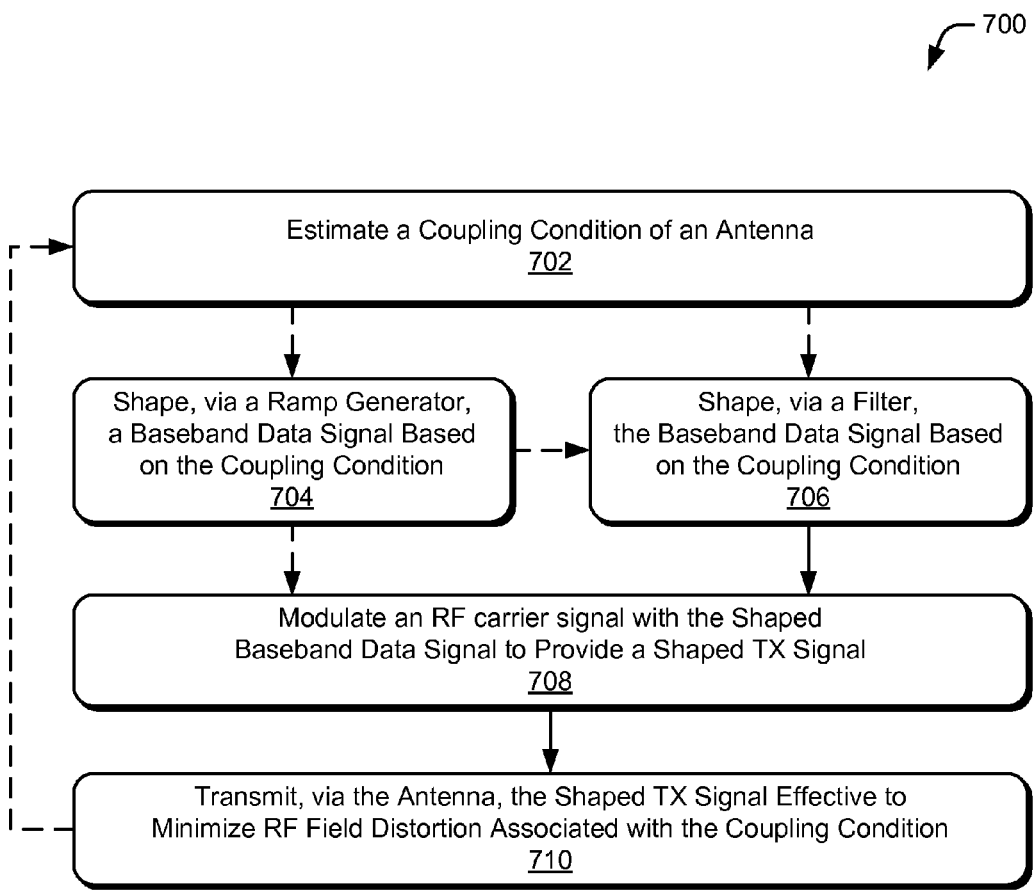
FIG. 7 illustrates another example method of shaping near-field transmission signals in accordance with one or more aspects.

FIG. 7 illustrates another example method 700 of shaping near-field transmission signals in accordance with one or more aspects. Operations of method 700 may be performed by various entities described with reference to FIGS. 1-4, such as signal-shape controller 120 of FIG. 1.

At 702, a coupling condition of an antenna is estimated. The coupling condition may be associated with a mutual inductance between the antenna and another antenna of another device. The coupling condition is estimated based on feedback received from a transmitter, such as monitored phases of voltage or current waveforms. Alternately or additionally, the coupling condition can be predicted via simulation or feedback associated with previous transmissions.

From operation 702, method 700 may proceed to 704 or to 706, both of which perform signal shaping operations. At

704, a baseband data signal is shaped with a ramp generator based on the estimated coupling condition. In some cases, a signal-shape controller determines parameters by which the ramp generator shapes the baseband data signal. From operation 704, method 700 may proceed to 706 for additional shaping operations, or proceed to 708.

At 706, a baseband data signal is shaped with a filter based on the estimated coupling condition. In some cases, a signal-shape controller determines parameters by which the filter shapes the baseband data signal. For example, the signal-shape controller may dynamically determine time-constants of the filter based on the estimated coupling condition of the antenna.

At 708, an RF carrier signal is modulated with the shaped baseband data signal to provide a shaped transmission signal. The RF carrier signal may be generated at any suitable frequency, such as approximately 13 Megahertz for near-field communication.

At 710, the shaped transmission signal is transmitted via the antenna to generate a modulated RF field. Transmitting the shaped transmission signal is effective to reduce RF field distortions associated with the coupling effect. For example, the shaped transmission signal may have reduced signal over-shoot, less signal ringing, or improved signal rise or fall times versus a non-shaped transmission signal.

Figure 8:
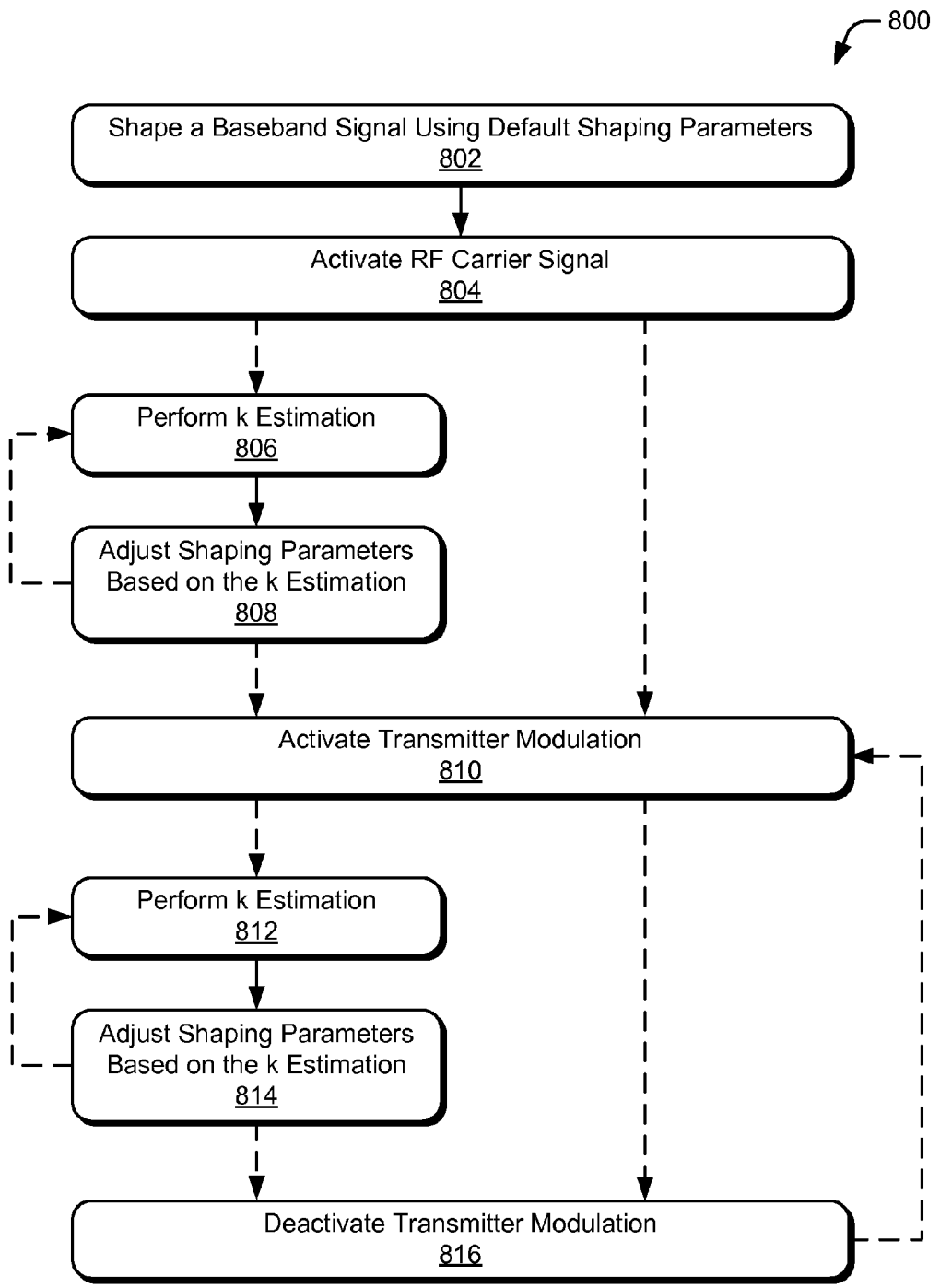
FIG. 8 illustrates an example method for adjusting shaping parameters based on an estimated coupling condition.

FIG. 8 illustrates an example method 800 for adjusting shaping parameters in accordance with one or more aspects. Operations of method 800 may be performed by various entities described with reference to FIGS. 1-4, such as signal-shape controller 120 of FIG. 1 or k-estimator 404 of FIG. 4.

At 802, a baseband signal is shaped with default shaping parameters. The default shaping parameters are configured to compensate for various coupling conditions to which an antenna of a device is subjected. The default shaping parameters may be determined via simulation, lab experimentation, and/or optimized for a wide array of coupling conditions. Alternately or additionally, the default parameters can be set based on feedback received from a transmitter during previous data transmissions.

At 804, an RF carrier signal is activated. The RF carrier signal is generated at full amplitude for subsequent modulation with the baseband signal via a modulator. Shaping the baseband signal is effective to preserve transmitter efficiency because power of the full amplitude RF carrier signal is not lost due to direct RF shaping operations or transmission via a quality factor-lowering resistor.

Optionally at 806, estimation of a coupling condition (k) of an antenna is performed. The estimation is based on any suitable feedback, such as current amplitude sensed in a transmitter. Alternately or additionally, the estimation can be based on a phase measurement of voltage or current waveform in the transmitter.

At 808, the shaping parameters for shaping the baseband signal are updated based on the k estimation. The shaping parameters are updated to provide a shaped baseband signal that is optimized for the k estimation. The shaping parameters may be updated from their default values or previously set values. From operation 808, method 800 may proceed to 810 or return to 806 to perform a subsequent k estimation. Performing multiple iterations of operations 806 and 808 can dynamically update or adapt the shaping parameters to compensate for varying coupling conditions to which the antenna is subjected.

At 810, transmitter modulation is activated. This is effective to generate an RF carrier signal with which the shaped baseband signal is modulated for transmission. Once the transmitter modulation is active, the shaped baseband signal is up-converted to provide a shaped transmission signal for transmission via the antenna.

Optionally at 812, estimation of a coupling condition (k) of an antenna is performed while the transmitter is active. As described above, the estimation is based on any suitable feedback, such as current amplitude sensed in a transmitter. Alternately or additionally, the estimation can be based on a phase measurement of voltage or current waveform in the transmitter. From this feedback, an entity such as k-estimator 404 can estimate current coupling conditions of an antenna.

At 814, the shaping parameters for shaping the baseband signal are updated based on the k estimation performed while the transmitter is active. The shaping parameters can be adjusted dynamically while the shaped transmission signal is applied to the antenna. In some cases, this is effective to further reduce distortions of the RF field generated when the shaped transmission signal is transmitted. From operation 814, method 800 may proceed to 816 or return to 812 to perform subsequent k estimation. Performing multiple iterations of operations 812 and 814 can be effective to dynamically update or adapt the shaping parameters to compensate for varying coupling conditions to which the antenna is subjected.

At 816, the transmitter modulation is deactivated when transmission of the shaped transmission signal is complete. In some cases, the transmitter may provide additional feedback for k estimation prior to deactivating. This feedback may be useful during subsequent data transmissions. Additionally, from operation 816, method 800 may return to operation 810 when additional data is ready for transmission.

Figure 9:
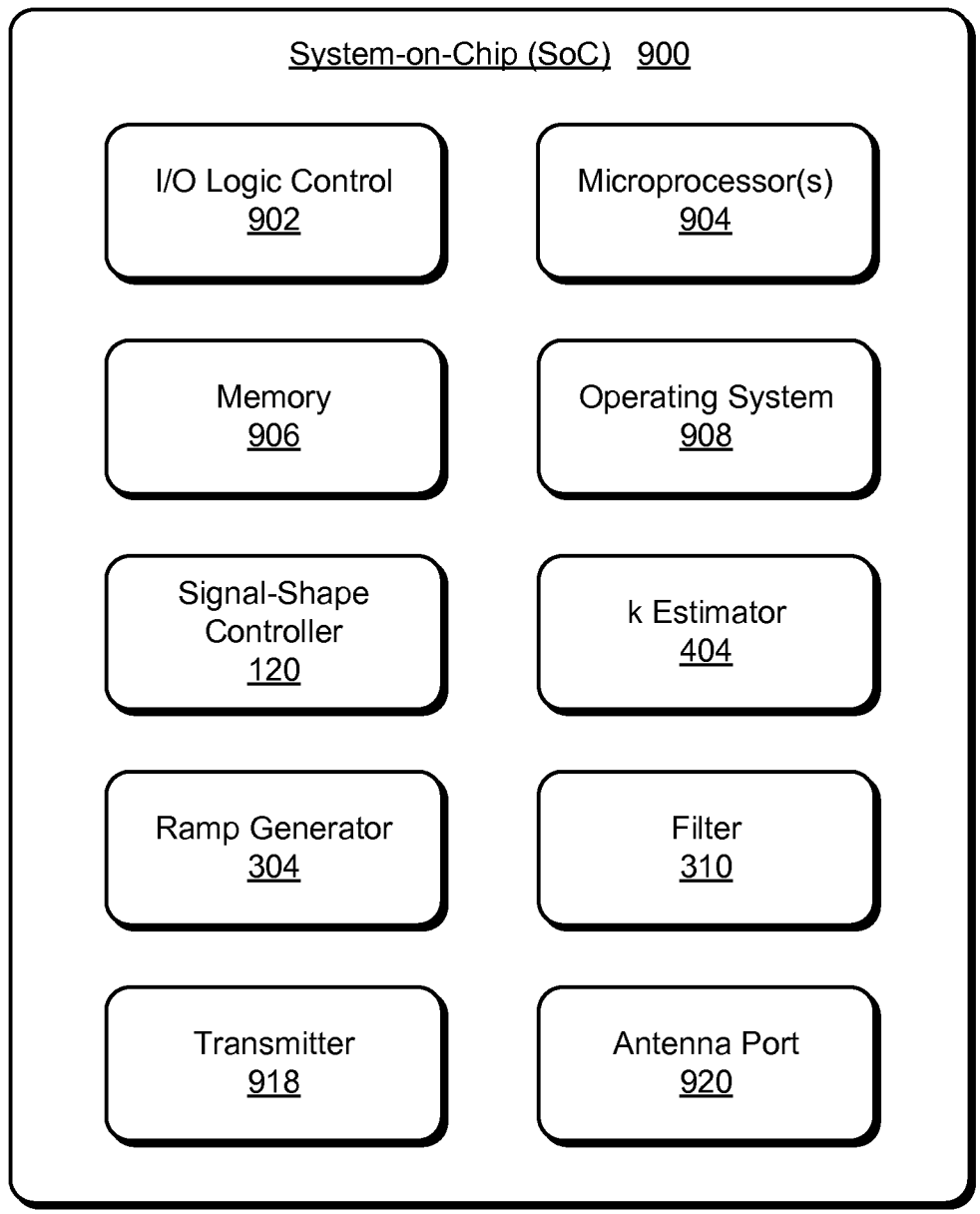
FIG. 9 illustrates various components of a System-on-Chip (SoC) that can implement aspects of shaping near-field transmission signals.

FIG. 9 illustrates a System-on-Chip (SoC) 900, which can implement various aspects of shaping short-range transmission signals. A SoC can be implemented in any suitable device, such as a video game console, IP-enabled television, smart-phone, desktop computer, laptop computer, access point, wireless router, cellular broadband router, tablet computer, server, network-enabled printer, set-top box, printer, scanner, camera, picture frame, home appliance, thermostat, home automation device, point-of-sale terminal, and/or any other type of electronic device. Alternately or additionally, components of SoC 900 can be implemented as various other electronic devices, such as an application processor, baseband processor, transceiver chip, application-specific integrated circuit (ASIC), field programmable gate array (FPGA), and so on.

SoC 900 can be integrated with electronic circuitry, a microprocessor, memory, input-output (I/O) logic control, communication interfaces, other hardware, firmware, and/or software needed to provide functionalities of a device, such as any of the above-listed devices. SoC 900 can also include an integrated data bus or crossbar (not shown) that couples the various components of the SoC for data communication between the components. A polling device that includes SoC 900 can also be implemented with many combinations of differing components. In some cases, these differing components may be configured to implement concepts described herein over various network or data interfaces.

In this example, SoC 900 includes various components such as an input-output (I/O) logic control 902 (e.g., to include electronic circuitry) and microprocessor(s) 904. SoC 900 also includes a memory 906, which can be any type and/or combination of RAM, SRAM, DRAM, low-latency nonvolatile memory, ROM, one-time programmable (OTP) memory, and/or other suitable electronic data storage. Alternately or additionally, SoC 900 may comprise a data interface (not shown) for accessing additional or expandable off-chip memory, such as external SRAM, DRAM, or flash memory. SoC 900 can also include various firmware and/or software, such as operating system 908, which can be computer-executable instructions maintained by memory 906 and executed by microprocessors 904. SoC 900 may also include other various communication interfaces and components embodied as hardware, firmware, software, or any suitable combination thereof.

SoC 900 includes a signal-shape controller 120, k-estimator 404, ramp generator 304, and filter 310 (any of which may be embodied as disparate or combined components), such as those described elsewhere herein. Examples of these various components, functions, and/or entities, and their corresponding functionality, are described with reference to the respective components of the environment 100 and various components or configurations as illustrated by FIGS. 2, 3, and/or 4. SoC 900 also includes transmitter 918 and antenna port 920. Transmitter 918 is configured to generate signals suitable for transmission and may be paired with a receiver to implement a transceiver, such as polling transceiver 122 as described with reference to FIGS. 1 and 2. Antenna port 920 enables SoC 900 to be operably coupled with an antenna or antenna interface network.

Signal-shape controller 120, either independently or in combination with other entities (e.g., k-estimator 404, ramp generator 304, or filter 310), can be implemented as computer-executable instructions maintained by memory 906 and executed by microprocessor 904 to implement various embodiments and/or features described herein. Signal-shape controller 120 may also be provided integral with other entities of SoC 900, such as integrated a controller associated with various network interfaces or another suitable software, firmware, or hardware component within SoC 900. Alternatively or additionally, signal-shape controller 120 and the other components can be implemented as hardware, firmware, fixed logic circuitry, or any combination thereof that is implemented in connection with the network interfaces and/or other signal processing and control circuits of SoC 900.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   estimating a coupling condition of an antenna;
   shaping, based on the coupling condition of the antenna, a baseband data signal;
   modulating a radio frequency (RF) carrier signal with the shaped baseband data signal to provide a shaped transmission signal;
   applying the shaped transmission signal to the antenna to generate an RF field, the shaped transmission signal effective to reduce distortion of the RF field associated with the coupling condition;
   updating the coupling condition of the antenna; and
   dynamically adjusting the shaped transmission signal while the shaped transmission signal is applied to the antenna, the adjusting responsive to a changed coupling condition.

2. The method as recited in claim 1, wherein the estimating the coupling condition of the antenna is based on electrical characteristics of a previous transmission signal or previously-generated RF field.

3. The method as recited in claim 1, wherein shaping the baseband data signal uses a set of parameters optimized for a range of coupling conditions.

4. The method as recited in claim 1, wherein shaping the baseband data signal includes applying a ramp generator or filter to the baseband data signal.

5. The method as recited in claim 4, wherein the ramp generator is a programmable ramp generator or the filter is a programmable filter effective to enable dynamic shaping of the baseband data signal.

6. The method as recited in claim 1, further comprising modulating, via amplitude shift keying, a baseband signal with data to provide the baseband data signal.

7. The method as recited in claim 1, wherein the antenna is an antenna of a nearfield communication (NFC) polling device and the coupling condition of the antenna includes a mutual inductance between the antenna and another antenna of an NFC listening circuit.

8. A circuit comprising:
   one or more components configured to:
   shape a baseband data signal, the shaping based on a coupling condition of the antenna; and
   dynamically adjust the baseband data signal responsive to a change in the coupling condition during operation of the circuit;
   a modulator configured to:
   modulate a radio frequency (RF) carrier signal with the shaped baseband data signal to provide a shaped transmission signal; and
   responsive to the change in the coupling condition, modulate the RF carrier signal with the adjusted baseband data signal to provide an adjusted transmission signal; and
   a transmitter configured to:
   transmit the shaped transmission signal via the antenna to generate an RF field, the shaped transmission signal effective to reduce distortions of the RF field due to the coupling condition; and
   transmit the adjusted transmission signal to generate an RF field, the adjusted transmission signal effective to reduce distortions of the RF field due to the changed coupling condition.

9. The circuit as recited in claim 8, wherein the one or more components include a ramp generator configured to ramp a transition of the baseband data signal, or include a filter configured to filter the transition of the baseband data signal.

10. The circuit as recited in claim 8, wherein a signal-shape controller is configured to estimate the coupling condition by determining, based on feedback provided by the transmitter, characteristics of the coupling condition.

11. The circuit as recited in claim 10, wherein the signal-shape controller is further configured to cause, based on the characteristics of the coupling condition, the one or more components to dynamically shape the baseband data signal.

12. The circuit as recited in claim 8, wherein a frequency of the RF carrier signal is approximately 13 Megahertz.

13. The circuit as recited in claim 8, wherein the circuit is implemented in a device configured for near-field communication (NFC) or short-range wireless communication.

14. The circuit as recited in claim 8, wherein a shape of the shaped transmission signal is effective to compensate for excessive signal over-shoot, signal ringing, or signal rise or fall times in the first antenna.

15. A System-on-Chip comprising:
a modulator configured to modulate a radio frequency (RF) carrier signal with a baseband data signal to provide a transmission signal;
a transmitter configured to apply, through an antenna interface, the transmission signal to an antenna to produce an RF field; and
a signal-shape controller configured to:
determine a coupling condition of the antenna;
calculate, based on the coupling condition of the antenna, parameters for shaping the baseband data signal;
shape, based on the parameters, the baseband data signal effective to provide a shaped transmission signal that, when transmitted via the antenna, creates an RF field having reduced coupling condition-related distortion;
re-calculate, responsive to a changed coupling condition of the antenna, adjusted parameters for shaping the baseband data signal; and
dynamically adjust, during transmission and based on the re-calculated adjusted parameters, the baseband data signal effective to provide an adjusted transmission signal that, when transmitted, creates an RF field having reduced coupling condition-related distortion.

16. The System-on-Chip as recited in claim 15, wherein the signal-shape controller is further configured to determine the coupling condition of the antenna by receiving feedback from the transmitter, the feedback characterizing the coupling condition of the antenna.

17. The System-on-Chip as recited in claim 15, wherein the System-on-Chip further comprises a ramp generator or filter, and the signal-shape controller is further configured to shape the baseband data signal using the ramp generator or the filter.

18. The System-on-Chip as recited in claim 15, wherein the coupling condition is a result of mutual inductance between the antenna and another antenna of a near-field communication (NFC) listener circuit.

19. The System-on-Chip as recited in claim 15, wherein the System-on-Chip is embodied, in whole or part, as an NFC transceiver.

20. The System-on-Chip as recited in claim 15, wherein the System-on-Chip is embodied in a smart phone, table computer, laptop computer, gaming device, or point-of-sale terminal.

* * * * *